(12) United States Patent
Rangrej et al.

(10) Patent No.: US 12,492,820 B2
(45) Date of Patent: Dec. 9, 2025

(54) MIXER VANES

(71) Applicant: General Electric Company, Evendale, OH (US)

(72) Inventors: Rimple Rangrej, Bengaluru (IN); Saket Singh, Bengaluru (IN); Pradeep Naik, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 19/005,042

(22) Filed: Dec. 30, 2024

(65) Prior Publication Data
US 2025/0129941 A1   Apr. 24, 2025

Related U.S. Application Data

(62) Division of application No. 17/389,030, filed on Jul. 29, 2021, now Pat. No. 12,181,151.

(51) Int. Cl.
*F23R 3/14* (2006.01)
*F02C 7/22* (2006.01)

(52) U.S. Cl.
CPC .................. *F23R 3/14* (2013.01); *F02C 7/22* (2013.01); *F05D 2240/127* (2013.01); *F05D 2240/35* (2013.01); *F05D 2250/184* (2013.01)

(58) Field of Classification Search
CPC .... F02K 1/386; F02K 1/46–50; F23D 11/103; F23D 11/105; F23D 11/107; F23D 11/383; F23D 14/24; F23D 2900/14021; F23D 2900/14241; F23D 2900/14701; F23R 3/12; F23R 3/14
See application file for complete search history.

(56) References Cited

U.S. PATENT DOCUMENTS

| | | | |
|---|---|---|---|
| 2,430,657 A | 11/1947 | Zolleis | |
| 2,576,700 A | 11/1951 | Heinrich | |
| 4,165,609 A | 8/1979 | Rudolph | |
| 7,043,898 B2 | 5/2006 | Rago | |
| 8,061,142 B2 | 11/2011 | Kastrup et al. | |
| 9,347,663 B2 | 5/2016 | Poyyapakkam et al. | |
| 10,082,043 B2 | 9/2018 | Lefebvre et al. | |
| 2010/0074757 A1* | 3/2010 | Headland | F23C 7/004 416/227 R |
| 2011/0167785 A1 | 7/2011 | Moore et al. | |
| 2013/0145765 A1 | 6/2013 | Patel et al. | |
| 2013/0255261 A1 | 10/2013 | Abdelnabi et al. | |
| 2016/0146466 A1 | 5/2016 | Yang et al. | |
| 2017/0089584 A1 | 3/2017 | Poyyapakkam et al. | |
| 2018/0142894 A1 | 5/2018 | Stytsenko et al. | |

(Continued)

FOREIGN PATENT DOCUMENTS

| CA | 2430657 A1 | 7/2002 |
|---|---|---|
| CN | 102414513 A | 4/2012 |

(Continued)

*Primary Examiner* — Scott J Walthour
(74) *Attorney, Agent, or Firm* — Venable LLP; Andrew W. Bradshaw; Michele V. Frank

(57) ABSTRACT

A main mixer for an engine. The main mixer includes a plurality of mixer vanes located circumferentially around a mixer body. Each mixer vane includes a waveform profile. The waveform profile detaches or trips a boundary layer of an air flow across the mixer vane such that the waveform profile introduces turbulence into the air flow.

18 Claims, 7 Drawing Sheets

(56) References Cited

U.S. PATENT DOCUMENTS

2019/0170003 A1  6/2019  Figeureu et al.
2020/0041129 A1* 2/2020  Pal ........................... F23R 3/14

FOREIGN PATENT DOCUMENTS

| | | |
|---|---|---|
| CN | 102563703 A | 7/2012 |
| CN | 103635750 A | 3/2014 |
| CN | 109539314 A | 3/2019 |
| CN | 110805925 A | 2/2020 |
| CN | 110872954 A | 3/2020 |
| CN | 111911457 A | 11/2020 |
| EP | 0777115 A1 | 6/1997 |
| EP | 2505808 A2 | 10/2012 |
| JP | 2013148339 A | 8/2013 |
| KR | 102044668 B1 | 11/2019 |

* cited by examiner

MIXER VANES

TECHNICAL FIELD

This application is a divisional of U.S. patent application Ser. No. 17/389,030 filed on Jul. 29, 2021, the contents of which are hereby incorporated by reference in their entirety.

TECHNICAL FIELD

The present disclosure relates to a main mixer for an engine. More particularly, the present disclosure relates to mixer vanes of a main mixer for an engine.

BACKGROUND

An engine, such as a gas turbine engine, may include a main mixer for providing an air flow to a combustion section of the engine. The air through the main mixer may mix with a fuel flow to generate a fuel-air mixture. The main mixer typically includes mixer vanes that assist in mixing the air and fuel to provide the fuel-air mixture.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, it is to be understood that the following detailed description are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

The mixer vanes described herein may have bodies that define profiles having a wave shape. The wave shaped profile may include a plurality of crests and troughs. These crests and troughs may extend parallel to the air flow, normal to the air flow, or both parallel and normal to the air flow. The wave profile may operate to detach and to reattach the boundary layer of the air flow, thus creating turbulence within the air flow. Openings may also be provided in the waveform to suction in the air flow and to enhance turbulence across the mixer vane.

Figure 1A:
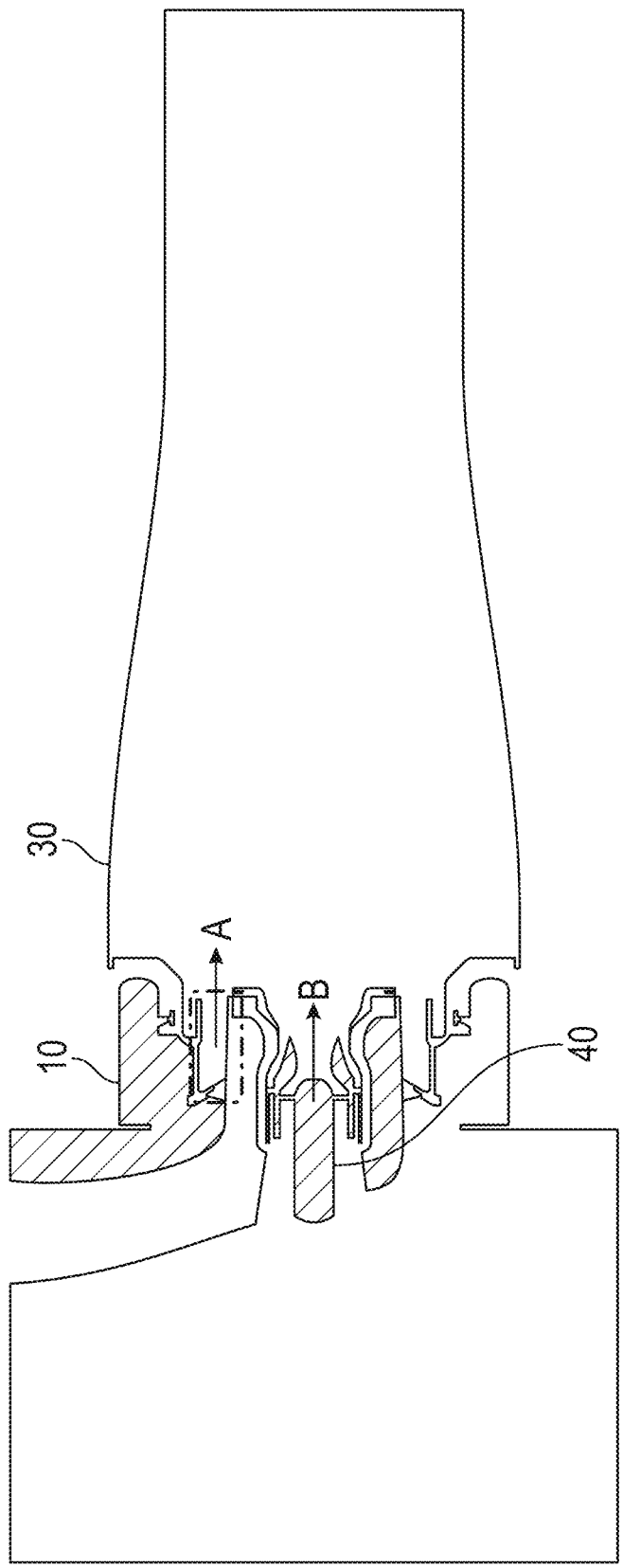
FIG. 1A shows a schematic cross-sectional view of a combustion section, taken along a centerline of the combustion section, according to an embodiment of the present disclosure.
Figure 1B:
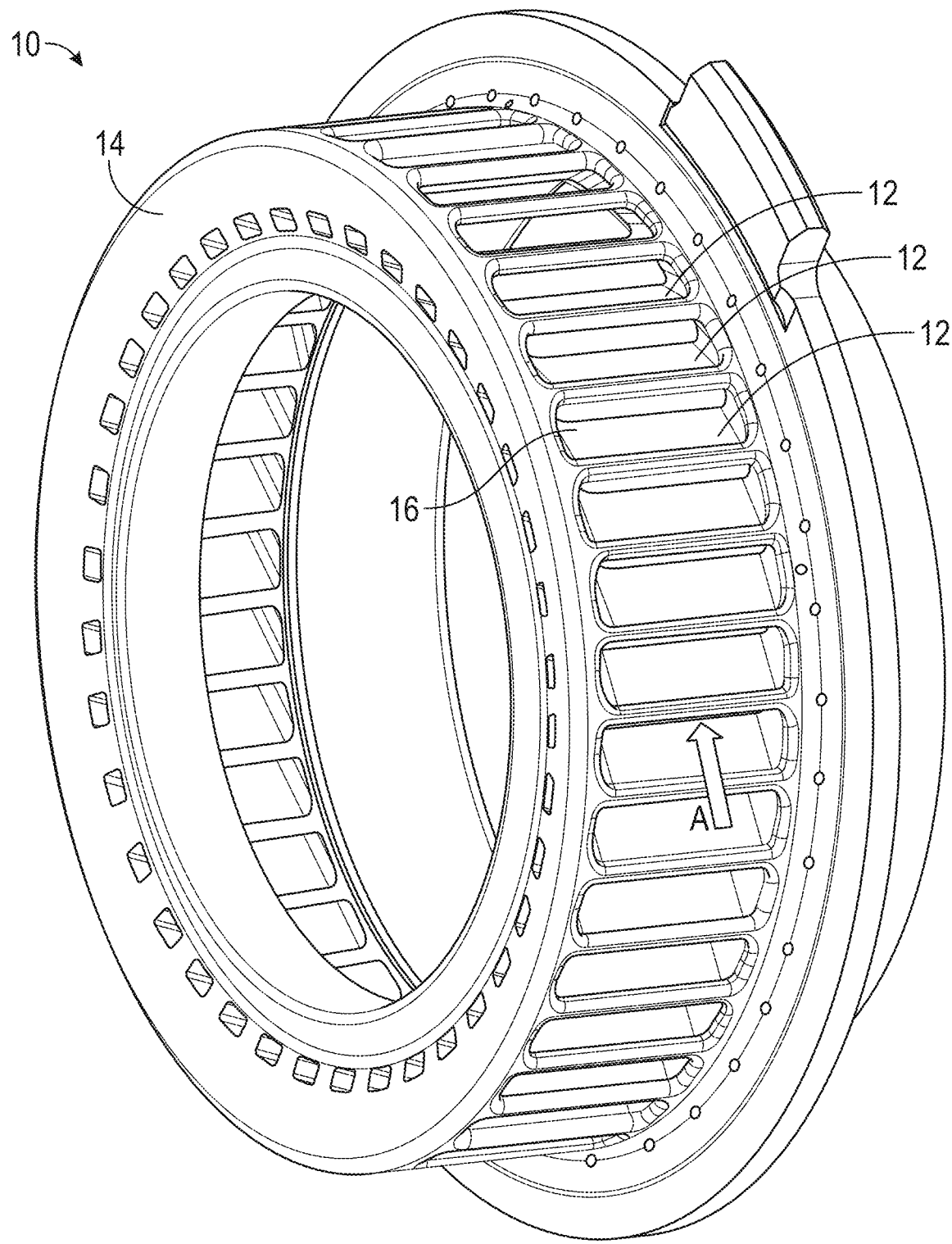
FIG. 1B shows a partial perspective view of a mixer for use with a combustion section, according to an embodiment of the present disclosure

FIGS. 1A and 1B show a mixer 10 for a combustion section 30 of an engine. The combustion section 30 may be a gas turbine combustor. The mixer 10 may be a main mixer. The mixer 10 may provide an air flow A to mix with a fuel flow B from a fuel nozzle 40 of the engine. Additionally, or alternatively, a fuel flow may be provided with the air flow A. The mixer 10 may include a plurality of mixer vanes 12. The mixer vanes 12 may be placed circumferentially around a mixer body 14 of the mixer 10. The mixer 10 may include a centerline such that the mixer body 14 is an annular mixer body, e.g., generally toroidal or donut shaped. As shown in FIG. 1B, the mixer vanes 12 may be substantially planar. That is, a surface 16 of the mixer vanes 12 may be planar. The surface 16 of the mixer vanes 12 may have no surface protrusions, indentations, or other features.

During operation, flow A through the mixer 10 may flow in the direction A across each of the mixer vanes 12. The flow A may be an air flow. The flow A may be an air flow for mixing with a fuel flow to create a fuel-air mixture for providing to a combustor of an engine.

Figure 2A:
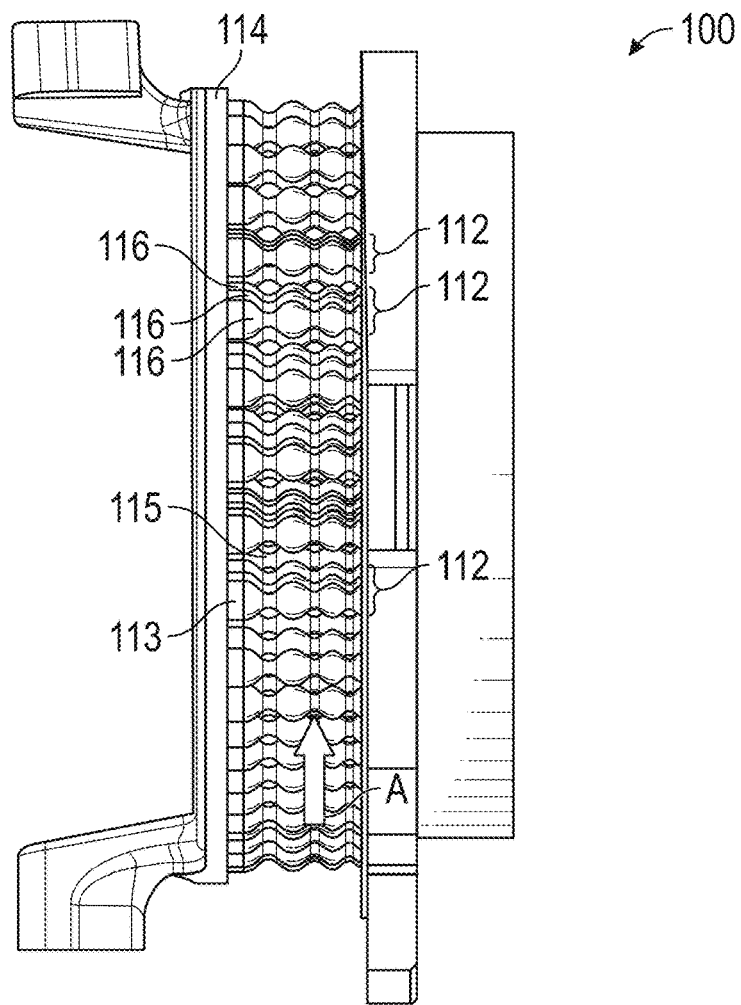
FIG. 2A shows a side view of a mixer, according to an embodiment of the present disclosure.
Figure 2B:
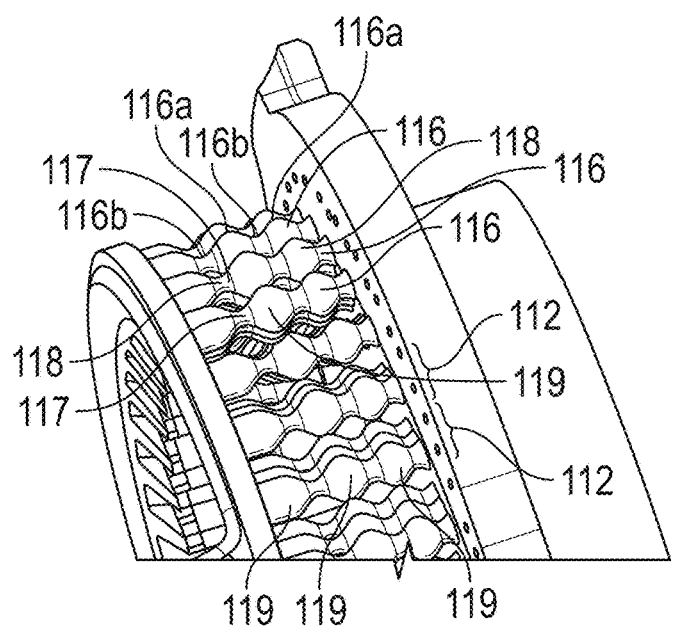
FIG. 2B shows a partial perspective view of the mixer of FIG. 2A, according to an embodiment of the present disclosure.

FIGS. 2A and 2B show a mixer 100. The mixer 100 may be a main mixer. The mixer 100 may include a plurality of mixer vanes 112. The mixer vanes 112 may be placed circumferentially around a mixer body 114 of the mixer 100. The mixer body 114 may be an annular mixer body. Each mixer vane 112 may include a body 116 or multiple bodies 116. Although three bodies 116 are shown for each mixer vane 112, more or fewer may be provided. The bodies 116 of a mixer vane 112 may be aligned along a common axis or common plane to form the respective mixer vane 112.

With continued reference to FIGS. 2A and 2B, each mixer vane 112 may include a leading edge 113 and a trailing edge 115. The leading edge 113 may be a surface of the first of the bodies 116 that faces an air flow A. The trailing edge 115 may be a surface of the last of the bodies 116 that is opposite to the leading edge 113. The air flow A may approach the leading edge 113, travel over the one or more bodies 116, and exit the mixer vane 112 at the trailing edge 115.

With reference to FIG. 2B, each body 116 may be formed with multiple bulbous portions 118 (e.g., enlarged spherical, ovoidal, or curved three-dimensional portions). For example, the body 116 may have first body portions 117 of a first diameter and second body portions 119 of a second diameter. The second diameter may be greater than the first diameter. The second body portions 119 may be the bulbous portions 118. The first body portions 117 and the second body portions 119 may provide the body 116 with an amoeba, wavy shape. In this manner, the body 116 may exhibit a profile having a plurality of crests 116a and a plurality of troughs 116b. The one or more bodies 116 may be separate and distinct bodies. That is, for example, the one or more bodies 116 may be unconnected from adjacent bodies 116 such that the mixer vane 112 is formed of multiple, separate, and unconnected bodies 116. Alternatively, the bodies may be integral and unitary. The form of the body 116 may be a waveform. That is, the first body portions 117 and the second body portions 119 may be such that the surface of the portions together provides the shape or profile of a wave (e.g., having rising and falling portions between crests).

FIGS. 2A and 2B show the bodies 116 having the second body portion 119 as curved, bulbous portions 118. However, any shape may be provided to achieve a profile having crests and troughs as described herein. For example, the bodies may include enlarged body portions, such as second body portions 119 that are other shapes, including, but not limited to, triangles, rounded triangles, semicircles, rectangular, trapezoid, polygon, or other shapes. The shape of the second body portions 119 may define the waveform of the mixer vane profile.

During operation, and, as shown in FIG. 2A, the air flow A may flow through the mixer 100 across the mixer vanes 112. As the air flows over the waveform provided by each of the bodies 116, the crests 116a of the bodies 116 may trip the boundary layer. That is, the profile formed by the body 116 may create turbulence in the air flow A. The boundary layer of the air flow A may be "tripped" or broken when crossing the crests of the vane profile. This detaching of portions of the boundary layer may generate turbulence in the air flow A. The added turbulence due to tripping of the air flow at the peaks (e.g., crests 116a) may enhance mixing of the air flow with the fuel flow, thus creating a more uniform air-fuel mixture. The boundary layer may be suctioned or drawn down, with the assistance of the openings if provided (e.g., openings as described later with respect to FIG. 8), into the shallow region (e.g., the troughs) of the waveform and again trip the air flow as the air flow approaches the next adjacent crest. This tripping and drawing back may be repeated across each crest/trough of the waveform, increasing the turbulence, and thus enhancing the mixing. The turbulence at the trailing edge may be the maximum turbulence in the air flow A flowing through the mixer 100.

Figure 3A:
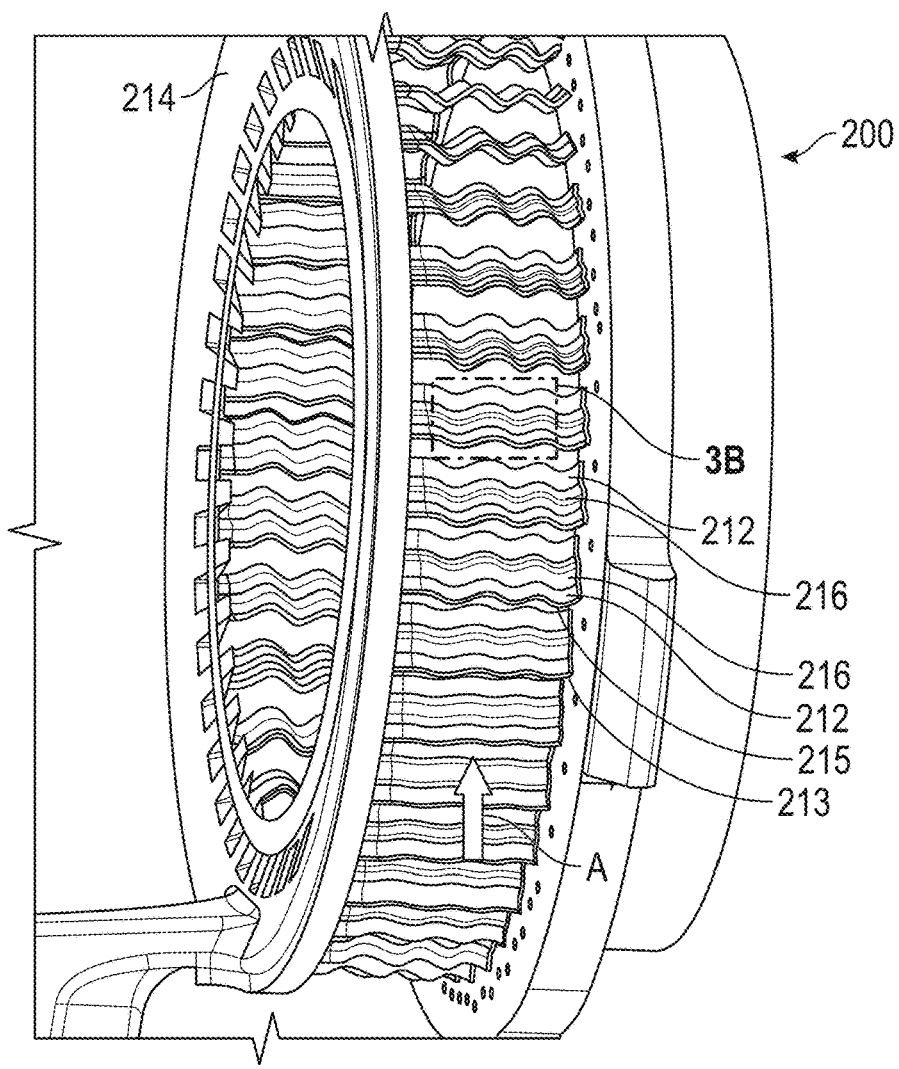
FIG. 3A shows a partial perspective view of a mixer, according to an embodiment of the present disclosure.
Figure 3B:
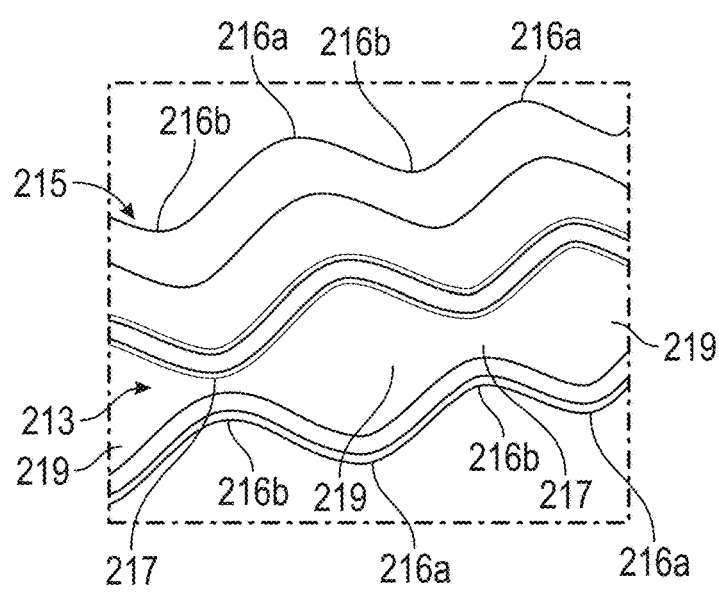
FIG. 3B shows a partial perspective view of a mixer vane of the mixer of FIG. 3A, according to an embodiment of the present disclosure.

FIGS. 3A and 3B show a mixer 200 with a plurality of mixer vanes 212 disposed about a mixer body 214, which may be an annular mixer body. In the mixer 200, the mixer vanes 212 may include a single body 216. The body 216 may be formed such that the body 216 includes first body portions 217 and second body portions 219. The second body portions 219 may be an increased dimension portion with respect to the first body portions 217, which may be a decreased dimension portion. The body 216 may thus include crests 216a and troughs 216b. The body 216 may include an upper surface that includes a curved profile extending through a series of crests 216a and troughs 216b and a lower surface that includes a curved profile extending through a series of crests 216a and troughs 216b. Although shown on both the upper surface and the lower surface of the mixer vane 212, the curved profile may be present on only the upper surface or only the lower surface. Each mixer vane 212 may include a leading edge 213 and a trailing edge 215. The air flow A may approach the leading edge 213, travel over the body 216 of the mixer vane 212, and exit the mixer vane 212 at the trailing edge 215.

FIGS. 3A and 3B show the body 216 of the vane 212 as curved. However, any shape may be provided to achieve a profile having crests and troughs as described herein. For example, the bodies may include second body portions 219 that are other shapes, including, but not limited to, triangles, rounded triangles, semicircles, rectangular, trapezoid, polygon, or other shapes. The shape of the second body portions 219 may define a waveform of the mixer vane profile.

When the profile is curved, such as shown in FIGS. 2A and 2B and FIGS. 3A and 3B, flow across the vanes may be smooth. When the profile is sharp, such as, for example, with a sharp tooth (e.g., see FIG. 7), the boundary layer may be tripped sooner resulting in an increase the turbulent kinetic energy.

With reference to FIGS. 2A to 3B, the mixer vanes 112 and the mixer vanes 212 may be shaped in a waveform normal to the flow direction. That is, the profile formed by the bodies 116 and the body 216 may generally define a wave and the face of that profile may be normal to the direction of the air flow A. For example, the troughs (e.g., troughs 116b and troughs 216b) and the crests (e.g., crests 116a and crests 216a) may be arranged normal to the air flow A, thus not in the direction of the air flow A. Due to the waveform being normal to the flow, the mixer vanes 112 and the mixer vanes 212 may create compression and expansion in the air flow, as is described with respect to FIG. 4. The bodies 116 and the body 216 may impart a particular flow characteristic to the air flow A. For example, the bodies 116 and the body 216 may create turbulence in the flow that may improve turbulent kinetic energy and thus improve fuel-air mixing in the combustor.

Figure 4:
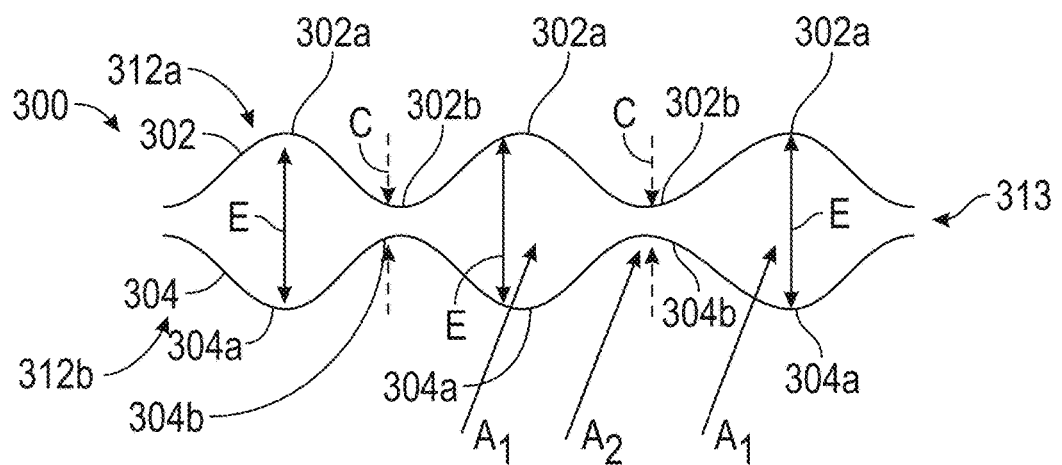
FIG. 4 shows a schematic of flow through a mixer, according to an embodiment of the present disclosure.

FIG. 4 shows a schematic of a profile 300 formed by adjacent mixer vanes 112 and/or adjacent mixer vanes 212 of FIGS. 2A and 3A, respectively. The profile may include a first profile 302 and a second profile 304. The first profile 302 may be a lower profile of a first mixer vane 312a, that is, the first profile 302 may be formed by a lower surface of the first mixer vane 312a. The second profile 304 may be an upper profile of a second mixer vane 312b, that is, the second profile 304 may be formed by an upper surface of the second mixer vane 312b. The first mixer vane 312a and the second mixer vane 312b may be adjacent mixer vanes such that there are no intervening mixer vanes between the first mixer vane 312a and the second mixer vane 312b.

With continued reference to FIG. 4, the first profile 302 may include a plurality of crests 302a and troughs 302b. The second profile 304 may include a plurality of crests 304a and troughs 304b. The crests 302a and the crests 304a may be aligned along the same axial centerline. Similarly, the troughs 302b and the troughs 304b may be aligned along the same axial centerline. Considering FIG. 4 in view of FIGS. 2B and 3B, the crests 302a and the crests 304a may correspond to the second body portions 119 and the second body portions 219, while the troughs 302b and the troughs 304b may correspond to the first body portions 117 and the first body portions 217.

In FIG. 4, airs flow $A_1$ and $A_2$ approach the leading edge 313 of the first mixer vane 312a and the second mixer vane 312b, as shown. The profile 300 of the first mixer vane 312a and the second mixer vane 312b is aligned normal with the direction of the air flow $A_1$ and the air flow $A_2$. Thus, the air flow $A_1$ and the air flow $A_2$ flow in a space between the adjacent first mixer vane 312a and the second mixer vane 312b. As the air flow A approaches the leading edge 313, the boundary layer of the air flows $A_1$ and $A_2$ are detached, creating turbulence in the air flow. This process continues as the air flow crosses the first mixer vane 312a and the second mixer vane 312b (not visible from this frontal view of the mixer vanes). Each waveform the air flow crosses generates turbulence in the flow. As the turbulence in the air flow increases, the mixing with the fuel flow (FIG. 1, flow B) is enhanced. As may be appreciated by the lines E and lines C, the air flow A flow between the adjacent first mixer vane 312a and the second mixer vane 312b may expand and contract as the air flows across the vanes. A shearing effect may also occur between the air flow $A_1$ and the air flow $A_2$.

Figure 5A:
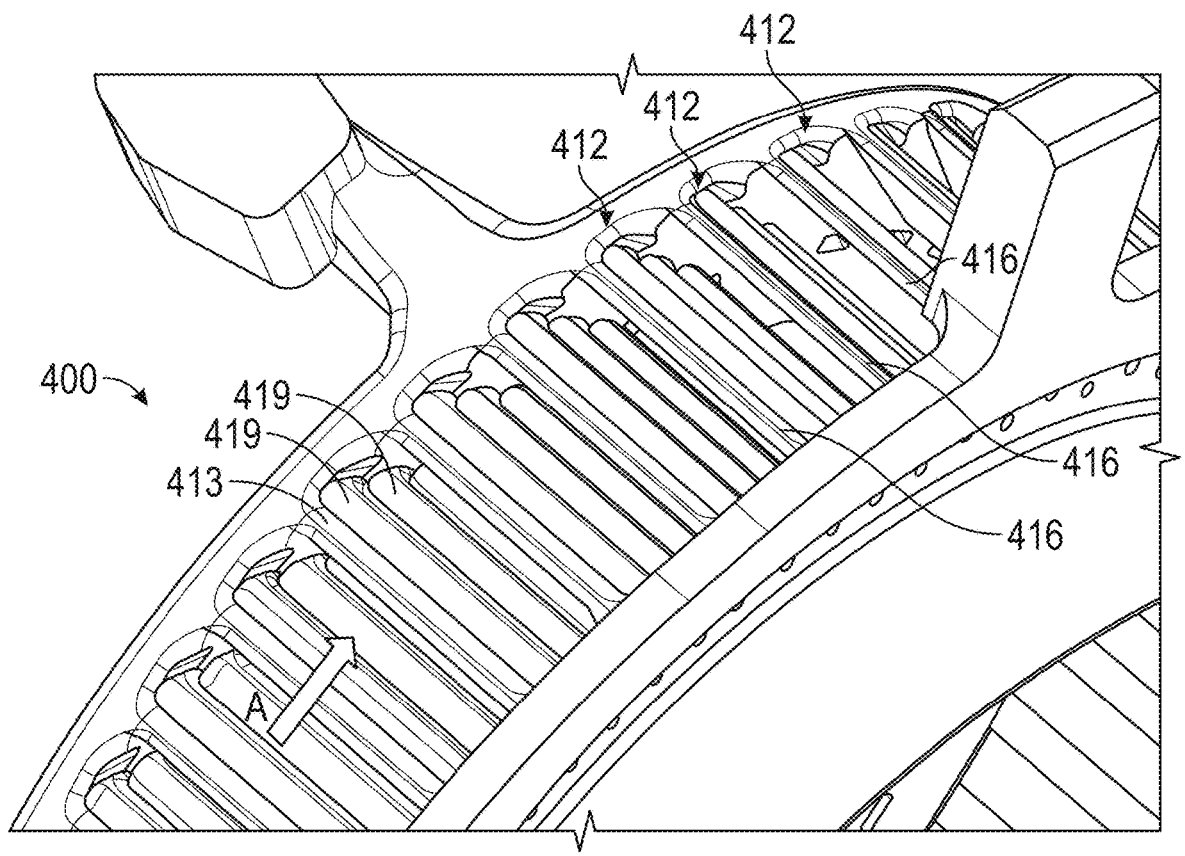
FIG. 5A shows a partial perspective view of a mixer, according to an embodiment of the present disclosure.
Figure 5B:
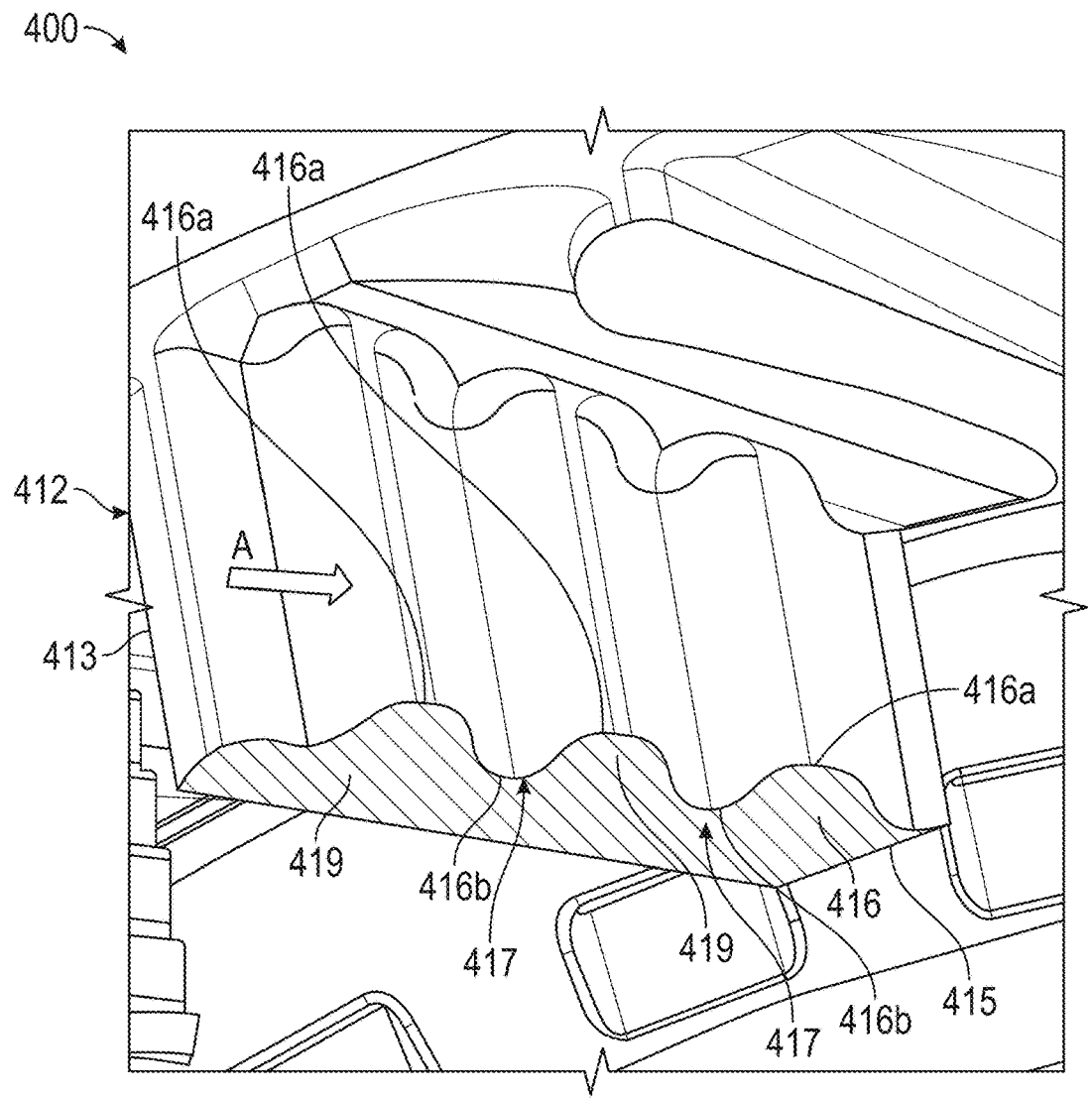
FIG. 5B shows a partial perspective view of a mixer vane of the mixer of FIG. 5A, according to an embodiment of the present disclosure.

FIGS. 5A and 5B show a mixer 400 with a plurality of mixer vanes 412 disposed about the annular mixer body. In the mixer 400, the mixer vanes 412 may include a body 416. The body 416 may be a single body. The body 416 may be formed such that the body 416 includes first body portions 417 and second body portions 419. The second body portions 419 may be increased in dimension with respect to the first body portions 417. The body 416 may thus include crests 416a and troughs 416b. The body 416 may include an upper surface that includes a curved profile extending through the series of crests 416a and troughs 416b. Although shown only on the upper surface, the profile may be present on both the upper surface and the lower surface of the mixer vane 412 or only the lower surface. Each mixer vane 412 may include a leading edge 413 and a trailing edge 415. The air flow A may approach the leading edge 413, travel over the body 416 of the mixer vane 412, and exit the mixer vane 412 at the trailing edge 415.

FIGS. 5A and 5B show the body 416 of the mixer vane 412 as curved. However, any shape may be provided to achieve a profile having crests and troughs as described herein. For example, the bodies may include second body portions 419 that are other shapes, including, but not limited to, triangles, rounded triangles, semicircles, rectangular, trapezoid, polygon, or other shapes. The shape of the second body portions 419 may define a waveform of the mixer vane profile.

The profile of the body 416 may extend in the direction along with the air flow A (e.g., parallel with the air flow A). In FIGS. 2A and 2B, the profile 300 (FIG. 4) may extend normal to the air flow A. However, any of the mixer vanes of FIGS. 2A and 2B, FIGS. 3A and 3B, and FIGS. 5A and 5B may be oriented parallel or normal to the air flow A. The mixer vanes may include a waveform profile both along the air flow (e.g., parallel) and perpendicular to the air flow. That is, there may be crests and toughs in two directions (both axial and radial). This may generate boundary layer tripping and re-attachment on the surface of the mixer vane. This may generate high turbulence levels and uniform high turbulence kinetic energy levels throughout vane passage. The profile shown in FIGS. 2A and 2B and FIGS. 3A and 3B may also be considered to be a radial profile, as the profile of the bodies extends in the radial direction of the combustion section 30 (FIG. 1A). The profile in FIG. 4 may be considered to be an axial profile, as the profile of the body extends in the axial direction of the combustion section 30 (FIG. 1A). The body 416 (FIGS. 5A and 5B) may impart a particular flow characteristic to the air flow A. For example, the body 416 may create turbulence in the flow that may improve turbulent kinetic energy and thus improve fuel-air mixing in the combustor.

Figure 6:
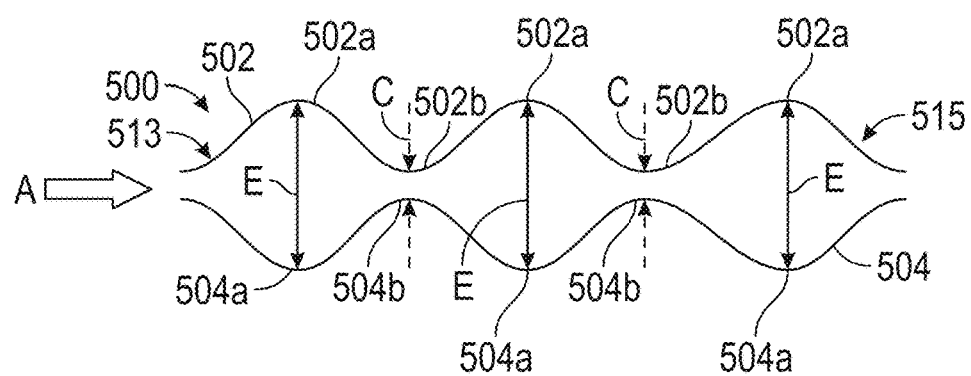
FIG. 6 shows a schematic of flow through a mixer, according to an embodiment of the present disclosure.

FIG. 6 shows a schematic of a profile 500 formed by the mixer vanes 412 of FIGS. 5A and 5B. The profile 500 may include an upper profile 502 and a lower profile 504. The profile 500 may be formed by a single mixer vane 412 as viewed along the length of the mixer vane 412. The upper profile 502 may include a plurality of crests 502a and troughs 502b. The lower profile 504 may include a plurality of crests 504a and troughs 504b. The crests 502a and 504a may be aligned along the same axial centerline. Similarly, the troughs 502b and 504b may be aligned along the same axial centerline. Considering FIG. 6 in view of FIGS. 5A and 5B, the crests 502a and 504a may correspond to the second body portions 419 while the troughs 502b and 504b may correspond to the first body portions 417.

In FIG. 6, the air flow A approaches the leading edge 513 of the vane, as shown. The profile 500 of the vane is aligned parallel with the direction of the air flow A. As the air flow A approaches the first of the crests 502a, the boundary layer of the air flow A is detached, creating turbulence in the air flow. This process continues as the air flow A crosses the remaining crests 502a, each time generating turbulence in the flow. As the turbulence in the air flow A increases, the mixing with the fuel flow (FIG. 1, flow B) is enhanced. The air flow A may have a maximum turbulence at the trailing edge 515. As may be appreciated by the lines E and lines C, the air flow A may expand and contract as the air flows across the vane.

Figure 7:
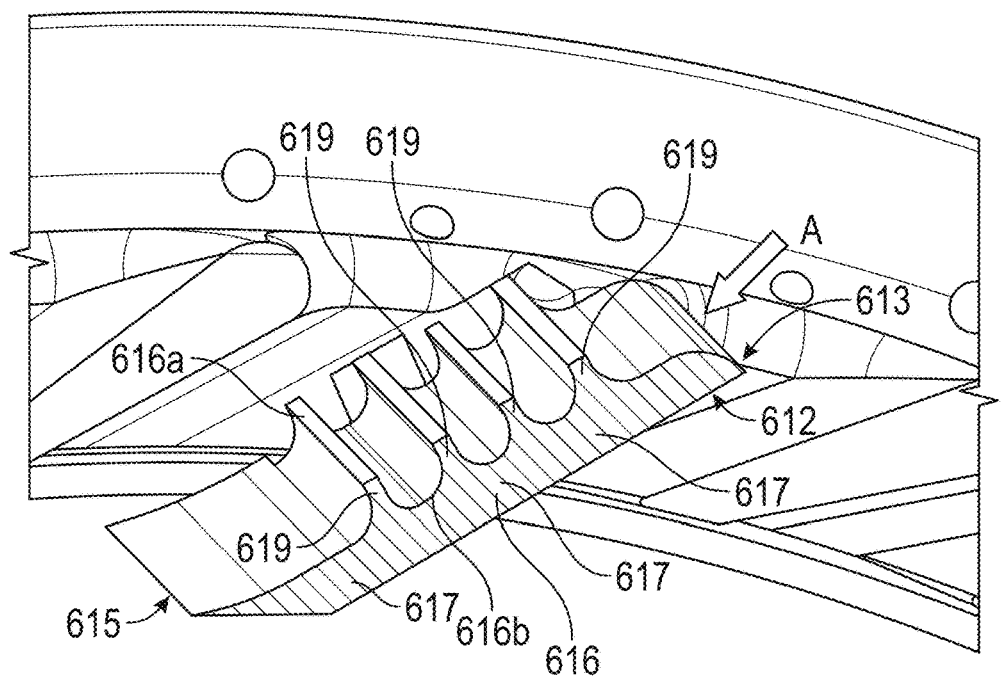
FIG. 7 shows a partial perspective view of a mixer vane, according to an embodiment of the present disclosure.

FIG. 7 shows a mixer 600 with a plurality of mixer vanes 612 disposed about the annular mixer body. In the mixer 600, the mixer vanes 612 may include a body 616. The body 616 may be a single body. The body 616 may be formed such that the body 616 includes first body portions 617 and second body portions 619. The second body portions 619 may be increased in dimension with respect to the first body portions 617. The body 616 may thus include crests 616a and troughs 616b. The body 616 may include an upper surface that includes a profile extending through the series of crests 616a and troughs 616b. Although shown only on the upper surface, the profile may be present on both the upper surface and the lower surface of the mixer vane 612 or only the lower surface. Each mixer vane 612 may include a leading edge 613 and a trailing edge 615. The air flow A may approach the leading edge 613, travel over the body 616 of the mixer vane 612, and exit the mixer vane 612 at the trailing edge 615.

With continued reference to FIG. 7, the profile formed by the second body portions 619 and the first body portions 617 may be a sawtooth profile. The crests 616a may be substantially flat and planar upper surfaces of the second body portions 619. The seal tooth structure or profile created by the second body portions 619 and the first body portions 617 may cause the air flow A to trip (e.g., detach) and re-attach to the surface of the mixer vane. This may generate turbulent kinetic energy. This disruption of the flow may lead to higher turbulent kinetic energy levels.

Figure 8:
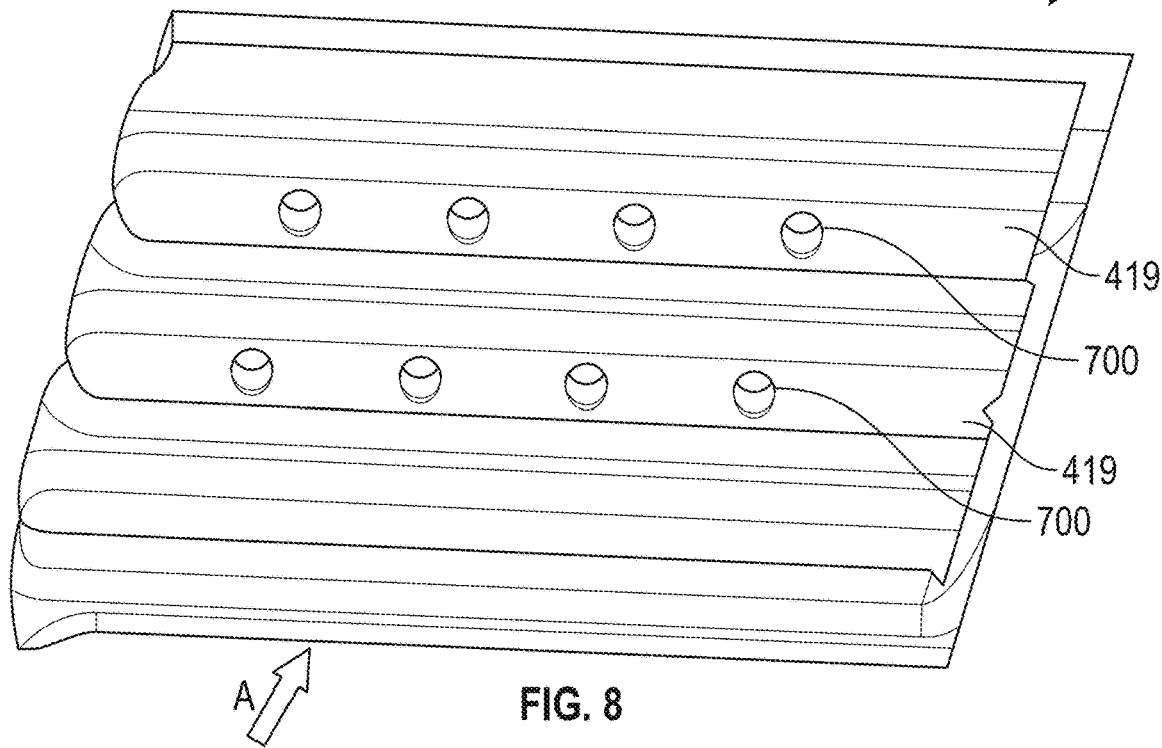
FIG. 8 shows a partial perspective view of a mixer vane, according to an embodiment of the present disclosure.

Referring to FIG. 8, any of the vanes described herein may include one or more openings, such as, for example, openings 700. FIG. 8 shows an exemplary vane similar to the mixer vane 412 of FIGS. 5A and 5B. The openings 700 may extend through each of the second body portions 419 of the body 416. In this manner, the holes may extend in the direction of the air flow A. Although shown in two of the second body portions 419, the openings 700 may be in any number of the second body portions 419 of the vane. Although four openings 700 are shown in each of the second body portions 419, more or fewer may be provided. As mentioned, although FIG. 8 depicts the openings 700 in mixer vane 412, the openings 700 may be provided in any of the vanes described herein.

With continued reference to FIG. 8, the openings 700 are also referred to as shaped holes 700 or shaped openings 700. The shaped holes 700 may be provided between waves (e.g., the rising and falling portions between crests). The shaped holes 700 may allow the air flow to wash to a bottom surface of the mixer vane 412 at an angle other than the vane angle. This may further enhance turbulence levels. As mentioned previously, the boundary layer of the air flow is tripped at the crests and the boundary layer air flow may be suctioned or drawn down, with the assistance of the openings 700. This may pull the air flow into the trough to be tripped again at the next adjacent crest of the waveform. The openings 700 may reattach the flow to the boundary layer, energizing the boundary layer on the back side of the vane, thus improving turbulence levels. The openings 700 may reduce energy losses across the mixer vane 412.

In the mixer vanes of the present disclosure, the waves (e.g., the rising and falling body forming the crests and troughs) may have a predetermined or selected slope, height, number, distance between crests/troughs, etc., that may be altered and may be selected to achieve a desired fuel-air mixing. The mixer vanes of the present disclosure may have waves of the same or different construction within a single vane or amongst several vanes. In some examples, the waves of the mixer vanes may decrease or increase in height from a leading edge of the vane to the trailing edge of the vane. The number of vanes, the number of curves or waves on the vane, the amplitude, the thickness of the vane, the direction with respect to flow (e.g., parallel and along the flow or normal to the flow), surface on which the waveform is present, or other features of the mixer vane may be altered, changed, or otherwise optimized based on the nature of the application, the desired flow rate, the desired engine operation, etc.

The mixer vanes of the present disclosure may be hollow with an outer surface to be of a wave shape. The mixer vanes may be radially, axially, or tangentially oriented in the mixer. The waveforms may be on one or both sides of the mixer vanes. Alternate shapes, such as, for example, but not limited to, squares, triangles, inverted U-shape, sine wave, cosine wave, etc., or combinations thereof, may be present in the mixer vanes to provide the waveform.

The mixer vanes of the present disclosure may be shaped in a waveform and/or in a saw tooth form normal to the flow direction. The mixer vanes of the present disclosure may be shaped in a waveform and/or in a saw tooth form that is parallel to or in line with the flow direction. The mixer vanes of the present disclosure may include a wavy surface in line (e.g., parallel) and perpendicular to the flow. That is, there may be crests and toughs in two directions (both axial and radial). This may generate boundary layer tripping and re-attachment on surface of the mixer vane. This may generate high turbulence levels and uniform high turbulence kinetic energy levels throughout the vane passage. The wavy surface or wave profile may be formed on both sides of the vanes with the crest of one side in line with the crest of the other side, and with the trough of one side in line with the trough of the other side of vane. This may create an air flow path that is sequentially converging and diverging in nature. This may create pulsation in pressure waves and helps to increase the turbulence levels within the vane passage.

The wave profile may have an inclined angle or may be angled with respect to an axis of the mixer vane. The vanes may include additional blowers (e.g., openings) that may effectively increase the turbulence level on the other surface of the vane. This pulsation may create better flow tripping and early attachment and hence higher increase in turbulence level. On the other side of the vanes, in the trough region, boundary layer blowing may help to avoid a low velocity region and re-attachment of flow on the vanes.

The mixer vanes of the present disclosure may allow for the mixer length to be reduced, thus reducing the weight, and resulting in a compact combustor.

The mixer vanes of the present disclosure may define waveforms on the surface thereof. The mixer vanes may be referred to as wavy vanes, amoeba wavy vanes, amoeba vanes, or the like.

Any of the mixer vanes and/or bodies described herein may be combined with any other feature or variation of any other mixer vane and/or body described herein. Any different shape of waveform may be provided on the same mixer vane and/or may be provided on different vanes. In some examples, all waveforms on a single vane are the same, all waveforms on all vanes in the mixer are the same, all waveforms on a single vane are different, some waveforms on a single vane are different, all waveforms in the mixer are different, and/or some waveforms in the mixer are different.

The mixer vanes of the present disclosure may improve turbulent kinetic energy levels, enhance fuel-air mixing, and improve $NO_x$ emissions as compared to a mixer without mixer vanes having a waveform arrangement. The mixer vanes of the present disclosure may operate or function as acoustic dampers for the air flowing through the mixer. For example, the waveforms may reduce pressure fluctuations in the flow through the mixer, thus operating as an acoustic damper.

The mixer vanes of the present disclosure may be used in lean and/or in rich combustors. The mixer vanes may impact heat release rate in a combustor, may enhance compressor dynamics, may reduce pressure fluctuations in the flow (e.g., act as a dampener), may reduce $NO_x$ emissions, or any combination thereof.

The mixer vanes of the present disclosure may allow for sequential boundary layer tripping and re-attachment using crests and troughs. This may create higher turbulence in the air flow, leading to better liquid fuel breakup and fuel-air mixing, which may in turn lead to lower $NO_x$ emissions, as compared to mixers without the mixer vanes of the present disclosure. The mixer vanes of the present disclosure having a wave profile or amoeba wave profile may improve turbulent kinetic energy, and hence, fuel air mixing in gas turbine combustors.

The mixer vanes of the present disclosure may include a wavy surface in line with (e.g., parallel) and perpendicular to the flow. That is, there may be crests and toughs in two directions (both axial and radial). This may generate boundary layer tripping and re-attachment on the surface of the mixer vane. This may generate high turbulence levels and uniform high turbulence kinetic energy levels throughout vane passage.

Further aspects of the present disclosure are provided by the subject matter of the following clauses.

A main mixer for an engine includes an annular mixer body and a plurality of mixer vanes located circumferentially around the annular mixer body. Each mixer vane of the plurality of mixer vanes includes a leading edge, a trailing edge, and a waveform profile, the waveform profile being configured to detach a boundary layer of an air flow across each mixer vane of the plurality of mixer vanes such that the waveform profile introduces turbulence into the air flow.

The main mixer of any preceding clause, wherein the air flow is more turbulent at the trailing edge of each mixer vane of the plurality of mixer vanes than at the leading edge of each mixer vane of the plurality of mixer vanes.

The main mixer of any preceding clause, wherein the waveform profile is formed on an upper surface of each mixer vane of the plurality of mixer vanes, a lower surface of each mixer vane of the plurality of mixer vanes, or both the upper surface and the lower surface of each mixer vane of the plurality of mixer vanes.

The main mixer of any preceding clause, each of the mixer vanes of the plurality of mixer vanes further comprising multiple bodies, each of the multiple bodies having multiple bulbous portions, wherein the waveform profile is formed by multiple bodies and the multiple bulbous portions form a crest of the waveform profile.

The main mixer of any preceding clause, wherein the waveform profile is a formed by a seal tooth structure, squares, triangles, inverted U-shape, sine wave, cosine wave, or combinations thereof.

The main mixer of any preceding clause, further comprising one or more shaped openings extending through the waveform profile, the one or more shaped openings configured to suction the air flow toward a surface of each mixer vane of the plurality of mixer vanes.

The main mixer of any preceding clause, each mixer vane of the plurality of mixer vanes further comprising a body having a series of crests and troughs, the waveform profile being formed by the series of crests and troughs.

The main mixer of any preceding clause, wherein the boundary layer of the air flow is configured to detach at each crest of the series of crests.

The main mixer of any preceding clause, wherein the waveform profile is aligned such that the series of crests and troughs is normal to the air flow.

The main mixer of any preceding clause, wherein the waveform profile is aligned such that the series of crests and troughs is parallel with and along a direction of flow of the air flow.

The main mixer of any preceding clause, wherein the waveform profile extends in a direction parallel with the air flow and in a direction normal to the air flow.

An engine includes a combustor, a fuel nozzle configured to provide a fuel flow to the combustor, and a main mixer comprising a plurality of mixer vanes, each mixer vane of the plurality of mixer vanes having a waveform profile, the waveform profile being configured to detach a boundary layer of an air flow across each mixer vane of the plurality of mixer vanes such that the waveform profile introduces turbulence into the air flow. The air flow is configured to mix with the fuel flow.

The engine of any preceding clause, wherein the air flow is more turbulent at a trailing edge of each mixer vane of the plurality of mixer vanes than at a leading edge of each mixer vane of the plurality of mixer vanes.

The engine of any preceding clause, wherein the waveform profile is formed on an upper surface of each mixer vane of the plurality of mixer vanes, a lower surface of each mixer vane of the plurality of mixer vanes, or both the upper surface and the lower surface of each mixer vane of the plurality of mixer vanes.

The engine of any preceding clause, wherein the waveform profile is aligned normal to the air flow, aligned parallel with the air flow, or aligned both normal and parallel to the air flow.

The engine of any preceding clause, each of the mixer vanes of the plurality of mixer vanes further comprising multiple bodies, each of the multiple bodies having multiple bulbous portions, wherein the waveform profile is formed by multiple bodies and the multiple bulbous portions form a crest of the waveform profile.

The engine of any preceding clause, wherein the waveform profile is a formed by a seal tooth structure, squares, triangles, inverted U-shape, sine wave, cosine wave, or combinations thereof.

The engine of any preceding clause, further comprising one or more shaped openings extending through the waveform profile, the one or more shaped openings configured to suction the air flow toward a surface of each mixer vane of the plurality of mixer vanes.

The engine of any preceding clause, each mixer vane of the plurality of mixer vanes further comprising a body having a series of crests and troughs, the waveform profile being formed by the series of crests and troughs.

The engine of any preceding clause, wherein the boundary layer of the air flow is configured to detach at each crest of the series of crests.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

The invention claimed is:

1. A main mixer for an engine, the main mixer comprising:
an annular mixer body;
a plurality of mixer vanes located circumferentially around the annular mixer body, each mixer vane of the plurality of mixer vanes having:
a leading edge;
a trailing edge;
a body having a lower surface and an upper surface opposite the lower surface, and a plurality of first body portions arranged in series from the leading edge to the trailing edge, and a plurality of second body portions extending, in series with each other, between the leading edge and the trailing edge, the plurality of first body portions and the plurality of second body portions defining, in a cross-sectional plane extending from the leading edge to the trailing edge, a sawtooth profile including, in an alternating arrangement, a plurality of crests and a plurality of troughs; and
at least one shaped airflow opening extending through the body through the lower surface and through a surface of at least one of the plurality of troughs,
wherein an air flow passes over each mixer vane from the leading edge to the trailing edge, the sawtooth profile being configured to detach a boundary layer of the air flow across each mixer vane and to alter the air flow to create turbulence in the air flow.

2. The main mixer of claim 1, wherein the air flow is more turbulent at the trailing edge of each mixer vane of the plurality of mixer vanes than at the leading edge of each mixer vane of the plurality of mixer vanes.

3. The main mixer of claim 1, wherein the at least one shaped airflow opening is configured to suction the air flow toward the surface of the at least one of the plurality of troughs trough.

4. The main mixer of claim 1, wherein the at least one shaped airflow opening comprises a plurality of shaped airflow openings extending through the body through the lower surface and through the surface of each of the plurality of troughs.

5. The main mixer of claim 1, wherein the sawtooth profile is present only on the upper surface.

6. The main mixer of claim 1, wherein the sawtooth profile is present on both the upper surface and the lower surface.

7. The main mixer of claim 1, wherein the boundary layer of the air flow across each mixer vane is configured to detach at each of the plurality of crests.

8. The main mixer of claim 1, wherein each second body portion includes at least a portion of at least one of the plurality of troughs and one of the plurality of crests.

9. The main mixer of claim 1, wherein each of the plurality of crests is a substantially flat and planar upper surface of a respective one of the second body portions.

10. An engine comprising:
a combustor; and
at least one fuel nozzle configured to provide a fuel flow to the combustor,
the combustor including a main mixer having:
an annular mixer body;
a plurality of mixer vanes located circumferentially around the annular mixer body, each mixer vane of the plurality of mixer vanes having:
a leading edge;
a trailing edge;
a body having a lower surface and an upper surface opposite the lower surface, and a plurality of first body portions arranged in series from the leading edge to the trailing edge, and a plurality of second body portions extending, in series with each other, between the leading edge and the trailing edge, the plurality of first body portions and the plurality of second body portions defining, in a cross-sectional plane extending from the leading edge to the trailing edge, a sawtooth profile including, in an alternating arrangement, a plurality of crests and a plurality of troughs; and
at least one shaped airflow opening extending through the body through the lower surface and through a surface of at least one of the plurality of troughs,
wherein an air flow passes over each mixer vane from the leading edge to the trailing edge, the sawtooth profile being configured to detach a boundary layer of the air flow across each mixer vane and to alter the air flow to create turbulence in the air flow and to enhance mixing the air flow with the fuel flow.

11. The engine of claim 10, wherein the air flow is more turbulent at the trailing edge of each mixer vane of the plurality of mixer vanes than at the leading edge of each mixer vane of the plurality of mixer vanes.

12. The engine of claim 10, wherein the at least one shaped airflow opening is configured to suction the air flow toward the surface of the at least one of the plurality of troughs trough.

13. The engine of claim 10, wherein the at least one shaped airflow opening comprises a plurality of shaped airflow openings extending through the body through the lower surface and through the surface of each of the plurality of troughs.

14. The engine of claim 10, wherein the sawtooth profile is present only on the upper surface.

15. The engine of claim 10, wherein the sawtooth profile is present on both the upper surface and the lower surface.

16. The engine of claim 11, wherein the boundary layer of the air flow across each mixer vane is configured to detach at each of the plurality of crests.

17. The engine of claim 10, wherein each second body portion includes at least a portion of at least one of the plurality of troughs and one of the plurality of crests.

18. The engine of claim 10, wherein each of the plurality of crests is a substantially flat and planar upper surface of a respective one of the second body portions.

* * * * *